US008730581B2

(12) United States Patent
Schön et al.

(10) Patent No.: US 8,730,581 B2
(45) Date of Patent: May 20, 2014

(54) HEAD-UP DISPLAY FOR NIGHT VISION GOGGLES

(75) Inventors: Peter Schön, Jönköping (SE); Johan Zandén, Norrahammar (SE); Stefan Andersson, Habo (SE)

(73) Assignee: SAAB AB, Linköping (SE)

( * ) Notice: Subject to any disclaimer, the term of this patent is extended or adjusted under 35 U.S.C. 154(b) by 399 days.

(21) Appl. No.: 12/629,193

(22) Filed: Dec. 2, 2009

(65) Prior Publication Data

US 2014/0098425 A1    Apr. 10, 2014

(30) Foreign Application Priority Data

Dec. 2, 2008 (EP) ..................................... 08170492

(51) Int. Cl.
*G02B 27/01* (2006.01)
*G02B 27/10* (2006.01)

(52) U.S. Cl.
CPC ........ *G02B 27/0172* (2013.01); *G02B 27/0101* (2013.01); *G02B 27/1006* (2013.01)
USPC ......................................... 359/630; 359/634

(58) Field of Classification Search
CPC ............... G02B 27/01; G02B 27/0189; G02B 27/0101; G02B 27/0172; G02B 27/1006
USPC .......................................... 359/629–630, 634
See application file for complete search history.

(56) References Cited

U.S. PATENT DOCUMENTS

| 5,926,265 A * | 7/1999 | Task et al. ...................... 356/229 |
| 6,097,543 A * | 8/2000 | Rallison et al. ................ 359/633 |
| 2006/0284736 A1* | 12/2006 | Low ................................ 359/630 |
| 2007/0218428 A1* | 9/2007 | Taffet .............................. 434/41 |

FOREIGN PATENT DOCUMENTS

DE    102006005571 A1    8/2007

OTHER PUBLICATIONS

Hecht, Eugene. Optics. Reading, MA: Addison-Wesley, 1998. 77. Print.*
European Search Report—Apr. 22, 2009.

* cited by examiner

*Primary Examiner* — Zachary Wilkes
(74) *Attorney, Agent, or Firm* — Venable LLP; Eric J. Franklin

(57) ABSTRACT

A head-up display system for a vehicle facilitating the use of night vision goggles for a person in the vehicle during night vision conditions. The system includes a light source for providing light to an image source. The image source is arranged to project an image on a semi-transparent combiner mirror. The combiner mirror is arranged to superimpose the projected image onto a view of the environment in front of the vehicle by transmitting light rays from the environment and at the same time reflecting the projected image towards the eyes of an observer. The system includes a first and a second light source for alternatively providing light to the image source. The first light source is arranged to emit light of a first color to be used during daylight conditions, and the second light source is arranged to emit light of a second color to be used during night vision conditions, wherein the second color is mainly yellow or mainly orange.

13 Claims, 2 Drawing Sheets

HEAD-UP DISPLAY FOR NIGHT VISION GOGGLES

CROSS-REFERENCE TO RELATED APPLICATIONS

This application claims priority to European patent application 08170492.6 filed 2 Dec. 2008.

FIELD OF INVENTION

The present invention relates to optical presentation devices for vehicles. More particularly it relates to devices for combining an observer's view in front of a vehicle with a synthetic image by superimposing the latter on the former, so called head-up displays. Even more particularly it relates to head-up displays suitable for use together with night vision goggles.

BACKGROUND

In fast moving vehicles, such as aircraft, it may constitute a risk during flight of the aircraft, each time a pilot of the aircraft has to split his visual attention between what is happening in front of the vehicle and what is happening inside the vehicle, in particular on a dashboard showing flight information. Pilots of aeroplanes and helicopters are therefore often helped by a device called head-up display.

In a vehicle equipped with a head up display system, an observer, which usually is the pilot, observes the outside world through a windscreen of the vehicle, and a semi-transparent combiner mirror of the head-up display arranged in his forward line of sight such that a light ray from a distant object passes through the windscreen and then through the semi-transparent combiner mirror before it reaches an eye of the observer. Flight information symbols of an image source are reflected to the semi-transparent combiner mirror of the head up display, and appear for the observer to be superimposed on the perceived image of the outside world. This has the advantage that the observer does not have to shift his eyesight for gathering flight information. He also avoids having to refocus eyesight, since optical elements usually are arranged to provide a so called collimated image.

Head-up display system are known for use in e.g. military fighter aircraft. These displays presents flight information using a certain colour, in this case green, and the combiner mirror is provided with certain layers of optical coating to reflect light of that certain colour better than light of other colours. This also means that light of other colours are not reflected as much and therefore are transmitted better through the semi-transparent combiner mirror.

A different aspect of flying an aircraft is that during night vision conditions it is very hard to precisely manoeuvre the aircraft in relation to the environment, since the pilot has to rely on instrument readings in stead of eyesight of the environment. It is therefore an advantage to use night vision goggles, i.e., goggles that amplify the light captured by them such that it is possible for a pilot wearing the goggles to observe the ground and the environment in front of and around the vehicle in spite of the darkness. It has become particularly popular to use these night vision goggles in helicopters.

A further aspect of flying such a helicopter is that it would be advantageous if the pilot, equipped with night vision goggles, also could take advantage of the benefits of a head up display. However, it is not straightforward to take a head-up display system and fit it into a helicopter, whose pilot already owns a pair of night vision goggles, and expect it to work well. This have been realised by the inventors and will be further discussed below.

However, a main object of the present invention is to provide a head-up display system that can be fitted into a small aircraft, and whose pilot already is equipped with a pair of night vision goggles.

SUMMARY

The inventor has realised that a problem encountered when using night vision goggles together with a head up display system is that the light amplification tubes of the night vision goggles get saturated, "blinded" when the pilot look at the head-up display because of the flight information shown on the display is of a much higher intensity than the intensity of the light from the dark environment. Certain types of night vision goggles are provided with automatic gain control that automatically down-regulates the light amplification, such that the user does not get blinded. However, when doing that in this particular application, i.e., looking at the symbols of the head-up display, the view of the environment becomes correspondingly less amplified and therefore gets difficult or even impossible to observe.

An object of the present invention is therefore to provide a head-up display that can be used together with night vision goggles without the disadvantages mentioned above. Additionally, a further object is to provide a head up display is suitable for fitting into existing small aircraft such as small non-military helicopters, and at the same time suitable to use together with low cost night vision goggles.

The inventor has thus devised a head-up display for use together with low cost night vision goggles during nocturnal missions. One of these low cost types is called NVIS class B night vision goggles.

The invention provides a head up display system that comprises two separate light sources for rendering the flight information symbols on the head up display. One advantage of the head up display system is that it works both during daylight vision conditions and night vision conditions without being forced to use expensive so called NVIS class C night vision goggles. More precisely, the head up display system works during night vision conditions together with NVIS class B goggles.

Thus, according to a first aspect is disclosed a head-up display system for a vehicle comprising
first and second light sources for providing light to an image source, which image source is arranged to project an image on a semi-transparent combiner mirror, the semi-transparent combiner mirror having a coating being arranged to superimpose the projected image onto a view of the environment in front of the vehicle by transmitting light rays from the environment and at the same time reflecting the projected image towards the eyes of an observer, wherein the coating of the semi-transparent combiner mirror has a centred wavelength and wherein the two light sources are arranged for alternatively providing light to the image source; and wherein the first light source is arranged to emit light of a first colour to be used during daylight conditions, and wherein the second light source is arranged to emit light of a second colour to be used during night vision conditions, and wherein the second colour is mainly yellow or mainly orange.

The head-up display system where the second light source is arranged to emit light having a dominating wavelength in the range of 570-600 nanometers.

The head-up display system wherein the coating of the semi-transparent combiner mirror is centred at a wavelength within the range of 610-650 nanometers.

The head-up display system wherein the first colour is mainly red. As a comment, this is opposed to state of the art military fighter aircraft, where green is used both during daylight and night vision conditions.

The head-up display system wherein the first light source emits light having a dominating wavelength corresponding to the centred wavelength of the coating of the semi-transparent combiner mirror.

The head-up display system wherein the second light source emits light having a dominating wavelength of 590 nanometers.

The head-up display system wherein the first light source emits light having a dominating wavelength of 625 nanometers.

The head-up display system wherein the semi-transparent combiner mirror is provided with a coating centred at a wavelength of 630 nanometers.

The head-up display system wherein a semi-transparent flat folding mirror is arranged between the eyes of the observer and the semi-transparent combiner mirror for reflecting the image from the image source towards the semi-transparent combiner mirror.

The head-up display system wherein the semi-transparent combiner mirror is spherical or aspherical.

The head-up display system wherein the semi-transparent combiner mirror is spherical.

The head-up display system wherein the semi-transparent flat folding mirror is provided with a coating centred at the same wavelength as the coating of the semi-transparent combiner mirror.

The head-up display system for use together with night vision goggles.

The head-up display system wherein the night vision goggles are night vision goggles of NVIS class B.

There may also be arranged a third light source to enable the presentation of symbols of two different colours simultaneously during daylight conditions. In such a case the coating (s) of the semi-transparent combiner mirror, and the semi-transparent flat folding mirror, if present, is adapted to also reflect effectively light from this third light source.

It should be emphasized that the term "comprises/comprising" when used in this specification is taken to specify the presence of stated features, integers, steps or components but does not preclude the presence or addition of one or more other features, elements, integers, steps, components or groups thereof.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

Other features of the invention will be more apparent upon consideration of the following description and of the accompanying drawings, wherein.

DESCRIPTION OF PREFERRED EMBODIMENTS

Figure 1:
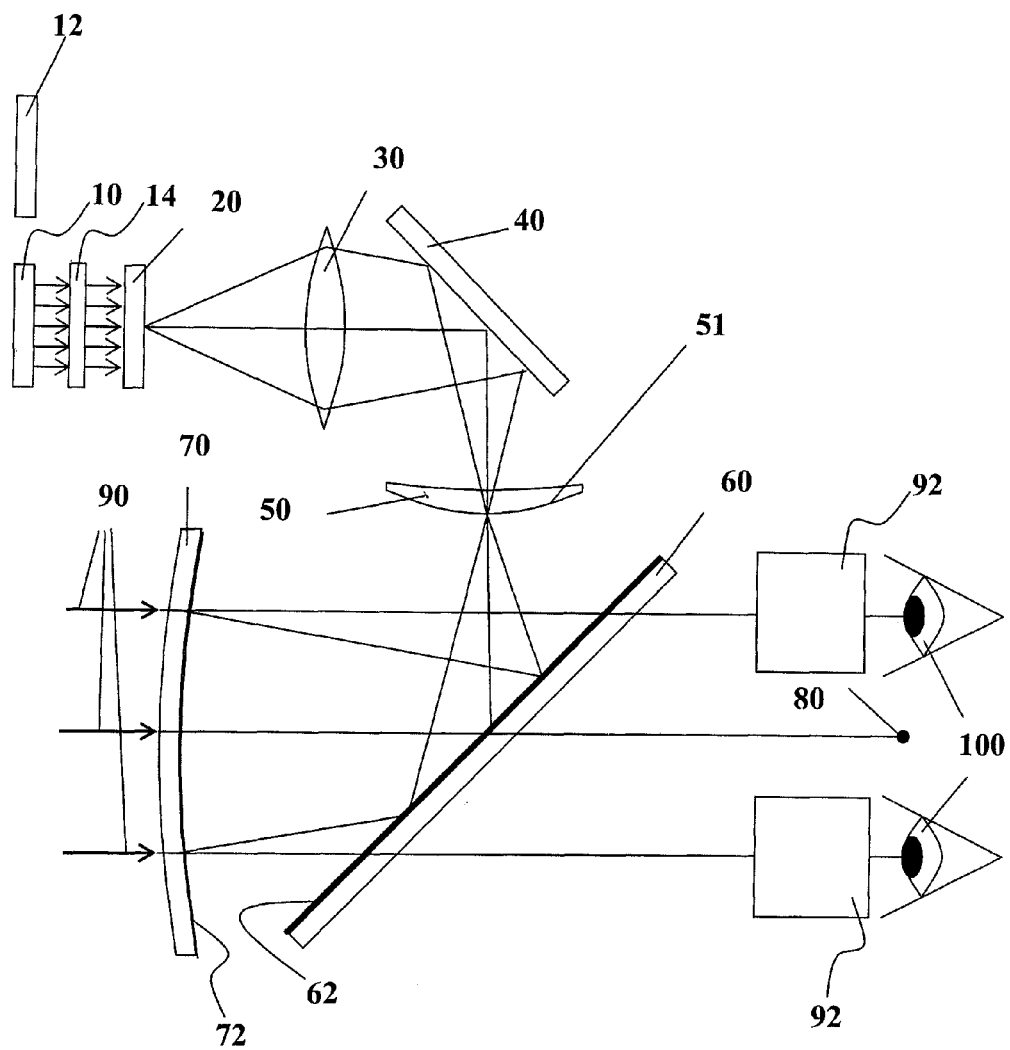
FIG. 1 shows a head-up display system for use together with night vision goggles during night vision conditions.

FIG. 1 shows a head-up display system for a vehicle permitting an observer in the vehicle to use night vision goggles 92 during night vision conditions, the system comprising two light sources 10, 12 for providing light to an image source 20, which image source is arranged to project an image on a semi-transparent combiner mirror 70. The combiner mirror 70 being arranged to superimpose the projected image onto a view of the environment in front of the vehicle by transmitting light rays 90 from the environment and at the same time reflecting the projected image towards the eyes (100) of an observer wherein the two light sources are arranged for alternatively providing light to the image source. There is thus a first light source 12 able to emit light of a first colour to be used during daylight conditions, and there is arranged a second light source 10 able to emit light of a second colour to be used during night vision conditions, wherein the first colour may is red and the second colour is chosen among dominating wavelengths between 570 and 600 nanometers, and including yellow and orange.

In more detail, there is provided a second light source of approximately 600 nanometer wavelength (orange), and corresponding dimming means such that light from this second light source, when reaching the pilots night vision goggles or unaided eye, after having traveled from the second light source via a semi-transparent combiner mirror 70, have an intensity of about 10,000 times the intensity of light of 670-930 nanometer (red and infrared) wavelength from the environment.

The semi-transparent combiner mirror 70 is provided with a coating 72 that is adjusted to the wavelength of the first light source 12, such that during daylight conditions light from the first light source 12 are transmitted and reflected efficiently to provide good contrast to a pilot's eye also without any vision aids.

Head-Up Part

Many head-up displays either use a flat mirror or an off-axis spherical (or aspherical or holographic) mirror as a combiner to combine an image with the background.

In order to achieve high image quality and small outer dimensions, a combiner is provided that comprises a spherical, or slightly aspherical, semi-transparent mirror 70 arranged relatively to a diffuser 50 such that a centre of an intermediate display image on said diffuser 50 comes on the optical axis (on-axis configuration) of the mirror 70. The optical axis is folded between the intermediate display image on the diffuser matt surface 51 and the collimating mirror 70 by a semi-transparent folding flat mirror 60. The collimated rays from the collimating mirror 70 and rays from the background 90 are transmitted through this semi-transparent mirror 60 to the eyes 100 or to a pair of night vision goggles 92. This means that some of the volume is passed twice or even three times by rays on their way from the display image to the eyes. This is a key feature for achieving small outer dimensions of the head up display system.

The folding flat mirror 60 is provided with a coating 62, and the semi-transparent collimating mirror 70 is provided with a coating 72. An image projected on the diffuser matt surface 51, is arranged in the focal plane of the collimating mirror 70. The diffuser lens 50 is arranged such that an image appears on one of its surfaces, preferably the surface closest to the flat mirror 60. That image is an intermediate image of the display surface 20. It is projected on the diffuser matt surface 51, the purpose of which is to spread the light from the image towards a sufficient large area of the collimating mirror 70 to allow for the pilot to move his head and still get collimated images of acceptable luminosity to both eyes 100. This is equal to say that the exit aperture is widened.

The collimating mirror 70 is in a preferred embodiment spherical but could be slightly aspherical, to improve the image quality further. By placing the collimating mirror 70 and choosing its radius of curvature such that its centre of curvature becomes close to the midpoint between the pilot's eyes 80, which is the centre of the exit aperture of the system, the quality of the collimated image will be high within a rather large eye position envelope and within a rather large field of view. For example, it is possible to achieve the image resolution and field of view needed with a radius of curvature of approximately 500 mm, which will allow the pilot to move his eyes within an area of at least 60×120 mm (up-down×sideways) without experiencing a noticeable decay in image quality.

To achieve the high quality collimated image, the diffuser matt surface 51 is arranged to be curved and the radius of curvature to be approximately half the (main) radius of curvature of the collimating mirror 70. The diffuser matt surface 51 may comprise a ground or sand blasted surface or a surface having a diffraction pattern or a holographic layer. The diffuser lens 50 is directing the light from the centre of the projection lens 30 towards the exit aperture centre 80, thereby acting as a field lens making the whole collimated image equally illuminated.

The semi-transparent collimating mirror 70 and the semi-transparent flat mirror 60 can be designed to reflect the main part of one (or a few) colour(s) while transmitting the main part of all other colours by applying alternative coating 62.

The head up display may further comprise a luminance control unit (not shown). The luminance of the background 90 is measured by a background luminance sensor (not shown) and the luminance of the intermediate image on the diffuser matt surface 51 is adjusted accordingly by adjusting the brightness of the image generating display 20 and/or the light source currently in operation 10, 12. Also the diameter of an aperture stop in the projection lens 30 may be varied and/or a variable attenuation filter may be used. The light sources 10, 12 may be one or several light emitting diodes (LED), and the average brightness of the light sources 10, 12 may be controlled by the luminance control unit by pulsing the current, i.e. by applying different rations between on- and off-periods. Using the above arrangement, the image on the diffuser surface 51 becomes automatically adjusted in brightness such that it becomes clearly visible relative to the background, including bright sky or sunny snow. The brightness is also adjusted such that the pilot does not become blind or dazzled or otherwise influenced such that he becomes impaired in vision regarding e.g. his ability to perceive details on a runway during bad light conditions.

The system may include a unit for automatically switching from one light source to the other depending on ambient light conditions. The switching may as an alternative be accomplished manually.

The coating 62 of the folding flat mirror 60 may preferably be centred at the same wavelength as the coating 72 of the semi-transparent collimating mirror 70. By the notation "centred" and "centred wavelength" is here understood the wavelength at which best optical reflexion is achieved.

The Invention and Military Standard 3009-(MIL-STD-3009)

According to MIL-STD-3009 of US Department of Defence (DoD), lighting and Night Vision Imaging Systems (NVIS) are divided into a number of classes. In the standard, a Night Vision Imaging system is defined as a system that uses image intensifier tubes to produce an enhanced image of a scene in light conditions too low for normal navigation and pilotage.

Figure 2:
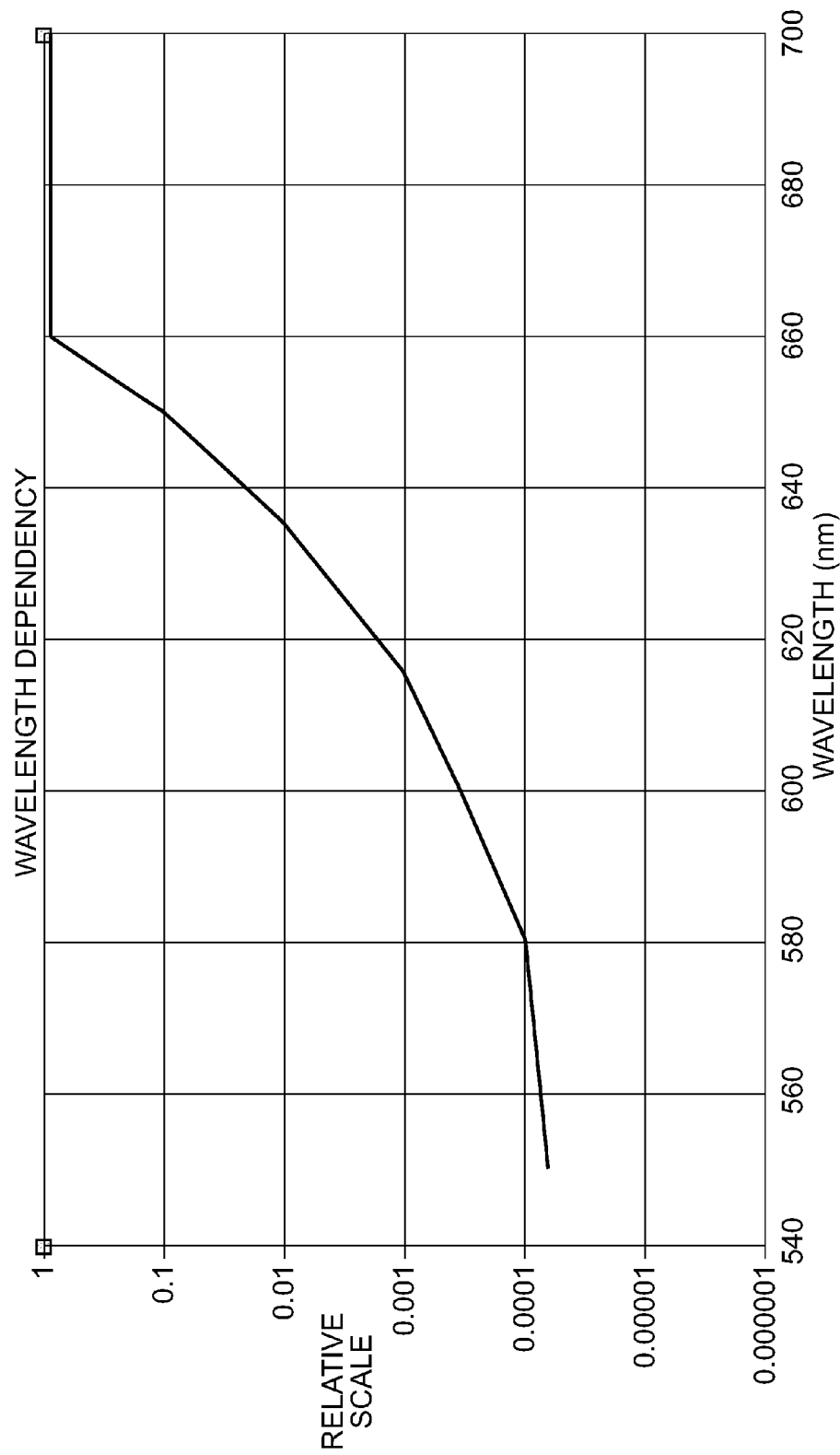
FIG. 2 shows a diagram of relative spectral response characteristics for night vision goggles of class B NVIS (Night Vision Imaging System).

According to the standard, Class B NVIS is any NVIS with spectral response characteristics as shown by the curve in FIG. 2.

Thus, an illumination unit 10, 12, 14 may comprise two types of light emitting diodes (LEDs); a first type intended to be used during daylight conditions and a second type intended to be used during night vision conditions. The first type, the "daylight" diode has a dominating wavelength of the emitted light of 625 nanometers and a half intensity bandwidth of 20 nanometers. A maximum luminance is 1300 lm. The second type, the "nightlight" diode has a dominating wavelength of the emitted light of 590 nanometers and a half intensity bandwidth of 18 nanometers. A maximum luminance is 60 lm. One or more diodes of each type may be employed to help achieve enough intensity, in particular for the daylight conditions case.

The head-up system is provided with a semi-transparent combiner mirror 70, arranged in the field of view of the pilot and that combines light from the environment in front of the pilot with symbolic information generated by an image generating devise using the light of the illumination unit with the diodes of above.

The combiner is provided with a reflective coating 72. The reflective coating of the combiner may advantageously be centred at 625 nanometers and be provided with a half intensity bandwidth of 38 nanometers of the reflection. Experiments have shown that this results in good photopic transmission through the combiner.

The head up display system works as follows: The coating 72 of the combiner is adjusted to the wavelength of the daylight diode, i.e., light from the daylight diode is reflected at a high percentage and reaches the unaided eye of the pilot at intensity suitable to comfortably read the symbols discernable in the environmental light during daylight conditions.

When, on the other hand, the nightlight diode is used to render symbols on the head up display during night vision conditions, the coating 72 of the semi-transparent combiner mirror 70 is arranged to, as described above, only reflect enough light to meet NVIS class B standards and such that enough light, i.e., light of an intensity that makes symbols clearly visible to the pilot when using NVIS class B goggles, is reflected.

Thus, to achieve that the appropriate light intensity from the nightligt lightsource as stated above reaches the pilots nights vision goggles, the reflective coating 72 of the collimating mirror 70 is arranged to have a first reflectivity spectrum. The first reflectivity spectrum is arranged to provide first reflectivity values of wavelengths of a first light wavelength span of light from the day lightsource, and also, to provide second reflectivity values for wavelengths of a second light wavelength span of light from the night lightsource. The first and second wavelength spans of the light sources are narrow, and may comprise a single wavelength each only, i.e., corresponding to monochrome light, or the spans may have a dominating wavelength with the intensity dropping rapidly for adjacent wavelengths. For wavelengths more than 20 nanometers away from the dominating wavelength the intensity may typically have dropped to less than 10% of the intensity at dominating wavelength. The half intensity bandwidth of the light from the light sources may be arranged to be in the interval 1-30 nanometers, preferably in the interval 15-25 nanometers, and most preferred 17-22 nanometers.

Of course, the coating of the collimating mirror is arranged to be mainly transmissive for most light wavelengths in order to transmit light from the outside environment. The reflective coating 72 of the collimating mirror 70 is arranged to have second reflectivity values that are arranged to be considerably lower than the first reflectivity values, confer above. The reflectivity spectrum for the coating 72 may preferably be arranged such that reflectivity is at the highest for the first light wavelength span and decreasing continuously towards shorter and longer wavelengths, with the reflectivity being considerably lower, but not zero, for light of second wavelength span. In this context, the expression "considerably lower" may comprise that the lower value is one order of magnitude lower than the higher value.

The reflective coating 62 of the folding flat mirror 60 is arranged to have a second reflectivity spectrum to provide third reflectivity values for wavelengths of the first light wavelength span, and fourth reflectivity values for wavelengths of the second light wavelength span. The fourth reflectivity values of the coating 62 is preferably arranged to be lower than the third reflectivity values. The ratio may be in the interval 0.05-0.5 between corresponding values. The third and fourth reflectivity values of the coating 62 of the folding flat mirror 60 is arranged to be less than the first and second reflectivity values of the coating 72 of the collimating mirror 70, i.e. the coating of the folding flat mirror is arranged to be less reflective, and more transmissive than the coating of the collimating mirror.

Thus, by the above described features it is attained that an appropriate overlap of three spectras, i.e., the intensity spectra for the nightlight ligthsource, the reflectivity spectra of the reflective coating 72 of the collimating mirror 70, and the reflectivity spectra the reflective coating 62 of the folding flat mirror 60, ascertains that the light intensity from the nightlight ligthsource that reaches the NVIS class B goggles is within an intensity level to both give a clear view of the environment and of symbols rendered by the aid of the said nightlight ligthsource. Thus, the spectras are arranged to give the above described appropriate overlap.

In this text "day lightsource" or "daylight lightsource" may also be referred to as "first lightsource", further, "night lightsource" or "nightlight lightsource" may also be referred to as "second lightsource"

The system may also be provided with a sharp filter at approximately 610-620 nanometers in the ray path after the second diode. The filter may preferably be such that it powerfully reduces wavelengths of the nightlight diode corresponding to the centred wavelength of the coating 72 of the combiner mirror 70. Such a filter is devised to reduce the transmission of light of longer wavelengths with a factor 1000. The effect is that light of wavelengths risking saturating the image intensifier tubes of the night vision goggles 92 is heavily reduced.

The daylight diode, i.e., the diode for use during daylight conditions, may preferably be a diode with a dominating wavelength of its emitted light of around 610-650 nanometers. In particular, the dominating wavelength of the daylight diode may be around 625 nanometers.

The nightlight diode may be a diode with a dominating wavelength of its emitted light of around 570-600 nanometers. In particular, the dominating wavelength of the nightlight diode may be around 590 nanometers.

The function of shifting from using the light from daylight diode to using light from the nightlight diode may be achieved by arranging the diodes such that they can be shifted from a first position where the first diode (12) is close to the image generator, to a second position where the second diode (10) is close to the image generator (20). In an alternative the diodes may be arranged opposite each other and with a pivotal mirror arranged between them to mirror light 90 degrees to the side. When shifting, the pivotal mirror is turned 90 degrees to reflect light from the other diode. Corresponding diodes are turned on and off respectively.

A third way to achieve the shifting may be to let the night time diode light to be injected via an optical fibre into the permanent light path and switch off the daylight diode and turn on the nightlight diode.

The nightlight diode is chosen with a wavelength that gives enough light through the combiner and does not affect the NVIS capability. Using lower wavelength would not give enough light and a higher wavelength would impair the NVIS capability. The red daylight diode is chosen with a wavelength that gives optimum contrast for the eye when used towards most background colours encountered by a pilot and the coating of the combiner is preferably optimized for the daylight diode dominating wavelength to give maximum performance during bright day conditions.

The image generator display 20 may be of a transmitting type, for example a Liquid Crystal Display (LCD) as shown in FIG. 1, or may be of a reflecting type, for example a Digital Micro-mirror Device (DMD), with corresponding change of the light sources 10, 12 position.

The head-up display optics may comprise optical elements 30-70 in a compact way to combine light rays of the image from the image source with light rays 90 representing the outside terrain such that a combined image reaches an observer's eyes 100. The optics may as an alternative be of some other arrangement as known by a person skilled in the art of head up displays.

The invention claimed is:

1. A head-up display system for a vehicle, the head-up display being configured for use with NVIS class B goggles, comprising:
   a semi-transparent combiner mirror;
   an image source arranged to project an image on the semi-transparent combiner mirror;
   an illumination unit comprising a first light source and a second light source for alternatively providing light to the image source, wherein the first light source comprises a first type of light emitting diode configured for use in daylight conditions, and wherein the second light source comprises a second type of light emitting diode configured for use during night vision conditions, the first type of light emitting diode having a dominating wavelength of emitted light of 625 nanometers and a half intensity bandwidth of 20 nanometers, the second type of light emitting diode having a dominating wavelength of emitted light of 590 nanometers and a half intensity bandwidth of 18 nanometers; and
   a luminance control unit arranged to adjust a brightness of at least one of the image source or the first light source or the second light source currently in operation,
   wherein the semi-transparent combiner mirror comprises a coating configured to superimpose the projected image onto a view of an environment in front of the vehicle by transmitting light rays from the environment and simultaneously reflecting the projected image towards eyes of an observer, wherein the coating of the semi-transparent combiner mirror is centered at a wavelength of 625 nanometers and is provided with a half intensity bandwidth of 38 nanometers of the reflection.

2. The head-up display system according to claim 1, further comprising:
   a semi-transparent flat folding mirror arranged between the eyes of the observer and the semi-transparent combiner mirror for reflecting the image from the image source towards the semi-transparent combiner mirror, wherein the semi-transparent flat folding mirror comprises a coating centered at a same wavelength as the coating of the semi-transparent combiner mirror.

3. The head-up display system according to claim 2, wherein the semi-transparent combiner mirror is spherical or asperical.

4. The head-up display system according to claim 2, wherein the semi-transparent combiner mirror is spherical.

5. The head-up display system according to claim 1, further comprising:
    a sharp filter at approximately 610-620 nanometers in a ray path after the second light source.

6. The head-up display system according to claim 5, wherein the filter is configured to reduce transmission of light of wavelengths longer than the centered wavelength of the coating of the semi-transparent combiner mirror by a factor of 1000.

7. The head-up display system according to claim 1, wherein the first type of light emitting diode has a luminance of 1300 lm.

8. The head-up display system according to claim 1, wherein the second type of light emitting diode has luminance of 60 lm.

9. The head-up display system according to claim 1, wherein the first light source and the second light source comprise a number of the first type of light emitting diode and the second type of light emitting diode, respectively, to achieve a predetermined intensity.

10. The head-up display system according to claim 1, wherein the second light source and the coating of the semi-transparent combiner mirror are configured to provide an intensity of light from the second light source such that after passing from the second light source to the semi-transparent combiner mirror and to the night vision goggles or an unaided eye have an intensity about 10,000 times an intensity of light of 670-930 nanometer wavelength from the environment.

11. The head-up display system according to claim 1, wherein the image source is arranged to reflect light from the illumination unit toward the semi-transparent combiner mirror.

12. The head-up display system according to claim 1, further comprising:
    a projection lens, a diffuser having a matte surface and a semi-transparent flat folding mirror arranged between the image source and the semi-transparent combiner mirror, wherein the a semi-transparent flat folding mirror is arranged between eyes of the pilot or observer and the semi-transparent combiner mirror to reflect an image from the image source toward the semi-transparent combiner mirror.

13. The head-up display system according to claim 1, further comprising:
    a semi-transparent flat folding mirror arranged between the eyes of the observer and the semi-transparent combiner mirror for reflecting the image from the image source towards the semi-transparent combiner mirror.

\* \* \* \* \*